United States Patent [19]
Okita et al.

[11] Patent Number: 5,153,063
[45] Date of Patent: Oct. 6, 1992

[54] MAGNETIC RECORDING MEDIUM HAVING A VINYL-CHLORIDE RESIN AND A URETHANE RESIN BINDER SYSTEM EACH OF WHICH RESINS CONTAIN THREE PERCENT OR LESS OF A LOW MOLECULAR WEIGHT RESIN FRACTION

[75] Inventors: Tsutomu Okita; Kazuko Hanai; Akihiro Matsufuji; Nobuo Aoki, all of Kanagawa, Japan

[73] Assignee: Fuji Photo Film Co., Ltd., Kanagawa, Japan

[21] Appl. No.: 752,912

[22] Filed: Aug. 28, 1991

Related U.S. Application Data

[63] Continuation of Ser. No. 185,180, Apr. 22, 1988, abandoned.

[30] Foreign Application Priority Data

Apr. 22, 1987 [JP] Japan ................................ 62-97524

[51] Int. Cl.⁵ .............................................. G11B 5/00
[52] U.S. Cl. ................................... 428/336; 428/424.6; 428/425.9; 428/694; 428/900
[58] Field of Search ............... 428/694, 425.9, 900, 428/572, 336, 424.6

[56] References Cited

U.S. PATENT DOCUMENTS

| | | | |
|---|---|---|---|
| 4,061,826 | 12/1977 | Petras et al. | 428/356 |
| 4,415,630 | 11/1983 | Kubota et al. | 428/403 |
| 4,529,661 | 6/1985 | Ninomiya et al. | 428/425.9 |
| 4,612,244 | 9/1986 | Keneda et al. | 428/323 |
| 4,637,959 | 1/1987 | Ninomiya et al. | 428/425.9 |

Primary Examiner—Paul J. Thibodeau
Assistant Examiner—Stevan A. Resan
Attorney, Agent, or Firm—Sughrue, Mion, Zinn, Macpeak & Seas

[57] ABSTRACT

A magnetic recording medium comprising a non-magnetic support having provided thereon a magnetic layer comprising ferromagnetic fine powder uniformly dispersed in a binder, wherein the binder comprises at least one resin selected from the group consisting of a vinyl chloride resin and a urethane resin, said resin for the binder has a weight average molecular weight of about from 20,000 to 80,000 and contains a low molecular weight fraction having a weight average molecular weight of about 3,000 or less in an amount of about 3 wt. % or less based on the amount of the resin.

9 Claims, No Drawings

MAGNETIC RECORDING MEDIUM HAVING A VINYL-CHLORIDE RESIN AND A URETHANE RESIN BINDER SYSTEM EACH OF WHICH RESINS CONTAIN THREE PERCENT OR LESS OF A LOW MOLECULAR WEIGHT RESIN FRACTION

This is a continuation of application Ser. No. 07/185,180 filed Apr. 22, 1988, now abandoned.

FIELD OF THE INVENTION

The present invention relates to a magnetic recording medium, and in particular, to a magnetic recording medium containing a ferromagnetic fine powder which has improved durability and surface properties. The magnetic recording medium of the present invention is used, for example, as a magnetic tape, magnetic sheet or magnetic disc.

BACKGROUND OF THE INVENTION

In the field of magnetic recording, improvement in the performance of the magnetic recording media is required with rapid progress of the technical art, and in particular, magnetic recording media for video use are required to have a high reproduction output for short wavelength recording. In order to attain these requirements, in general, a highly fine ferromagnetic powder is used in the magnetic layer of the magnetic recording medium, or a binder composition has been proposed to satisfy this requirement.

However, the conventional binder compositions which have heretofore been proposed for magnetic layers are improved to a certain point, but no binder composition which has completely satisfactory properties has yet been obtained.

Hitherto, as the binder for the magnetic layer, there have been used various synthetic resins such as vinyl chloride-vinyl acetate copolymers, cellulose resins, polyurethane resins, acrylic resins, vinylidene chloride resins, epoxy resins, phenoxy resins, synthetic rubber resins, polyester resins, etc., singly or in the form of a mixture of two or more of them. In particular, a combination of a polyurethane resin and a vinyl chloride-vinyl acetate copolymer or a combination of a polyurethane resin and a cellulose resin has been preferably used (as described, e.g., in Japanese patent application (OPI) Nos. 40320/84, 135426/82, 41435/83, and U.S. Pat. No. 4,411,957). The term "OPI" used herein means a published unexamined Japanese patent application.

Particularly, a recent tendency is for the ferromagnetic powder for the magnetic layer to be extremely fine for attaining the above-mentioned requirement, and that a ferromagnetic fine powder having a higher coercive force is used so as to improve the smoothness of the surface of the resulting magnetic layer and as to obtain a higher S/N (signal/noise) ratio. However, when the ferromagnetic powder in the magnetic layer is such highly fine grains, the grains of the powder are strongly bonded together because of the fineness of the grains and their magnetism, whereby it becomes extremely difficult to uniformly disperse the powder in a binder. If the dispersion of the ferromagnetic powder in the magnetic layer is insufficient, the uniformity of the magnetic layer, the orientation of the powder in the magnetic layer and the surface properties of the magnetic layer are poor, and as a result, it is impossible to obtain a high S/N ratio. Further, when the ferromagnetic powder is highly fine grains, the specific surface area of the powder increases so that the contact interface between the ferromagnetic powder and a binder solution is thereby increased and a larger energy is required for dispersing the ferromagnetic powder in the binder solution. This problem could partially be solved by improving the function of a mixer machine for dispersing the magnetic layer-forming composition, which, however, is naturally limited. Accordingly, a surfactant having a dispersing capacity has been added to the magnetic layer-forming composition (as described, e.g., in Japanese Patent Publication Nos. 28369/64, 17945/69, and U.S. Pat. No. 3,470,021). However, increase in the amount of the surfactant added for improvement of the dispersing capacity of the composition causes another problem of deterioration of the physical properties of the resulting magnetic layer.

In addition, magnetic recording media have a problem of static charging, and carbon black or an antistatic agent is generally added to the magnetic layer-forming composition for the purpose of static charge prevention of the resulting magnetic layer (as described, e.g., in Japanese patent application (OPI) No. 38201/77, and U.S. Pat. Nos. 3,545,974 and 3,475,174). This, however, often causes other problems, e.g., decrease in S/N ratio and an adhesion problem by blooming, etc. Recently, improvement of the binder itself has been proposed so as to improve the dispersibility of the ferromagnetic fine powder in the binder and to impart an antistatic property to the binder. For example, a binder having a polar group such as $-COOX$, $-SO_3X$, $-OSO_3X$, $-PO_3X_2$, $-OPO_3X_2$ (in which X represents a hydrogen atom, or an alkali metal atom such as Li, Na, or K) has been developed (as described, e.g., in Japanese patent application (OPI) Nos. 40320/84, 135426/82, and U.S. Pat. No. 4,411,957). This binder has been able to attain a limited improvement, but has insufficient characteristics for running durability. In particular, when a fine ferromagnetic powder having a specific surface area $S_{BET}$ 40 m$^2$/g or more is used with the binder, various problems occur. I.e., the running durability becomes extremely poor and the running tension noticeably increases. The running characteristics are particularly poor when the medium is run under severe high moisture conditions. Accordingly, a new technique capable of overcoming these problems is strongly desired.

SUMMARY OF THE INVENTION

An object of the present invention is to provide a magnetic recording medium having a magnetic layer, in which the dispersion of a ferromagnetic fine powder in a binder has been improved, and having an excellent running durability.

Other objects of the present invention will be apparent from the following description.

The present inventors earnestly studied high molecular polymers to be used as a binder with respect to the molecular weight thereof, and as a result have found that the above-mentioned objects can be attained by the use of high molecular polymers having a particular molecular weight as a binder, and that thereby the running durability of the resulting magnetic recording media can be extremely improved.

The present invention relates to a magnetic recording medium comprising a non-magnetic support having provided theron a magnetic layer comprising ferromagnetic fine powder uniformly dispersed in a binder, wherein the binder comprises at least one resin selected from the group consisting of a vinyl chloride resin and a urethane resin. the resin for said binder has a weight average molecular weight of about from 20,000 to 80,000 and contains a low molecular weight fraction having a weight average molecular weight of about 3,000 or less in an amount of about 3 wt % or less based on the amount of the resin.

DETAILED DESCRIPTION OF THE INVENTION

The magnetic recording media of the present invention basically have a magnetic layer which contains a ferromagnetic fine powder dispersed in a binder on a non-magnetic support.

Preferably, the ferromagnetic fine powder used in the present invention is a ferromagnetic alloy powder having a specific surface area ($S_{BET}$) of 40 m$^2$/g or more as measured by the BET method; and the binder preferably contains —SO$_3$M, —OSO$_3$M, —COOM, —OPO(OM$_1$)(OM$_2$) and/or —PO(OM$_1$)(OM$_2$), in which M, M$_1$ and M$_2$, which may be the same or different, each represents a hydrogen atom, an alkali metal or —N$^{\oplus}$R$_1$R$_2$R$_3$, and R$_1$, R$_2$, and R$_3$ which may be the same or different, each represents a hydrogen atom, or an alkyl, alkenyl, substituted alkyl, or substituted alkenyl group having from 1 to 12 carbon atoms, in an amount of from $1 \times 10^{-6}$ to $50 \times 10^{-6}$ equivalent/g of polymer. Further, the magnetic recording medium of the present invention may contain a polyisocyanate compound in the binder.

The ferromagnetic fine powder for use in the present invention includes iron oxide series materials and alloy series materials.

Examples of ferromagnetic iron oxides include $\gamma$-Fe$_2$O$_3$, weakly reduced $\gamma$-Fe$_2$O$_3$ (mixed crystal of $\gamma$-Fe$_2$O$_3$ and Fe$_3$O$_4$), and Co-coated ferromagnetic iron oxides formed by coating a Co-compound on the surface of the ferromagnetic iron oxides. The $\gamma$-Fe$_2$O$_3$ and the weakly reduced $\gamma$-Fe$_2$O$_3$ can be prepared by various methods, but in general, a starting material of an iron oxide hydrate of goethite or lepidocrosite is reduced to form a magnetite, which is then oxidized to provide a ferromagnetic $\gamma$-Fe$_2$O$_3$ or weakly reduced $\gamma$-Fe$_2$O$_3$ in the form of an acicular (needle-like) crystal. For preparing the Co-coated ferromagnetic iron oxide, the $\gamma$-Fe$_2$O$_3$ grains thus obtained are suspended in water, and then a Co-compound such as cobalt chloride and an excess alkali such as sodium hydroxide are added to the resulting suspension so as to coat the Co-compound over the surface of the $\gamma$-Fe$_2$O$_3$ grains, and the Co-coated grains are taken out from the reaction solution and optionally heat-treated at a relatively low temperature of about 120° C. or the like. For use in the present invention, the iron oxide grains prefarbly have a specific surface area ($S_{BET}$) of about 30 m$^2$/g or more, more preferably about 40 m$^2$/g or more, as measured by the BET method. This is because iron oxide grains having an $S_{BET}$ value of less than about 30 m$^2$/g are not expected to sufficiently improve the S/N ratio. The ferromagnetic grains thus having an $S_{BET}$ value of about 30 m$^2$/g or more can be obtained by properly selecting the size and $S_{BET}$ of the starting material of iron oxide hydrate grains. These iron oxide grains are described, e.g., in U.S. Pat. No. 3,836,393.

On the other hand, examples of ferromagnetic metals and alloys include Fe and alloys of Fe with other metal(s) or the like such as Ti, V, Cr, Mn, Co, Ni, Cu, Zn, Si, P, Mo, Sn, Sb, Ag, etc. These ferromagnetic metals can be prepared by various methods, for example, including a method in which an organic acid salt of a ferromagnetic metal is pyrolyzed and then reduced by contact with a reducing gas, a method in which an acicular oxyhydroxide, an acicular oxyhydroxide containing other metal(s), or an acicular iron oxide obtained by heating such an oxyhydroxide is brought into contact with a reducing gas for reduction, a method in which a metal carbonyl compound is pyrolyzed, a method in which a ferromagnetic metal is evaporated in an inert gas at a reduced pressure, a method in which an aqueous solution of a salt of a metal capable of forming a ferromagnetic substance is reduced with a reducing substance such as a boron hydride compound, a hypochlorite, or a hydrazine, a method in which a ferromagnetic metal powder is electrodeposited with a mercury cathode and then separated from the mercury, etc. The grains of the ferromagnetic metal powder thus obtained preferably have a specific surface area ($S_{BET}$) of about 40 m$^2$/g or more, more preferably about 45 m$^2$/g or more, as measured by the BET method. This is because ferromagnetic metal powder having an $S_{BET}$ value of less than about 45 m$^2$/g could not be expected to be able to sufficiently improve the S/N ratio. The ferromagnetic powder having an $S_{BET}$ value of about 45 m$^2$/g or more can be obtained by properly selecting the size and $S_{BET}$ of the starting material. The ferromagnetic metal powder is desired to have a coercive force Hc of about 1,000 Oe or more when this is employed for manufacture of magnetic recording media to be used for short wavelength recording, and the acicular ratio of the powder is preferably about 7 or more so as to ensure the necessary coercive force and to improve the orientation capacity of the magnetic grains. These ferromagnetic metal powders are described, e.g., in U.S. Pat. No. 3,389,014.

The specific surface area $S_{BET}$ of the above described ferromagnetic fine powder is preferably about 70 m$^2$/g or less, and more preferably 65˙m$^2$/g or less.

The amount of the ferromagnetic fine powder is preferably from 250 to 1,000 parts by weight, more preferably from 300 to 800 parts by weight per 100 parts by weight of the binder.

An important feature of the present invention is the use of a particular binder for formation of the magnetic layer, the binder being at least one selected from the group consisting of a vinyl chloride resin and a urethane resin which have a weight average molecular weight of about from 20,000 to 80,000 and contain a low molecular weight fraction having a weight average molecular weight of about 3,000 or less in an amount of about 3 wt % or less based on the amount of the resin. In particular, the binder preferably contains —SO$_3$M, —OSO$_3$M, —COOM, —OPO(OM$_1$)(OM$_2$), and/or —PO(OM$_1$)(OM$_2$), in which M, M$_1$ and M$_2$ each represent a hydrogen atom, an alkali metal, or —N$^{\oplus}$R$_1$R$_2$R$_3$, and R$_1$, R$_2$, and R$_3$ each represents a hydrogen atom or an alkyl, alkenyl, substituted alkyl, or substituted alkenyl group having from 1 to 12 carbon atoms, in an amount of from about $1 \times 10^{-6}$ to $50 \times 10^{-6}$ equivalent/g, more preferably from $5 \times 10^{-6}$ to $30 \times 10^{-6}$ equivalent/g.

The binder preferably further contains a polyisocyanate compound. The amount of the polyisocyanate compound is preferably from 10 to 50 wt %, more preferably from 15 to 40 wt % based on the amount of the binder.

In the above-mentioned polar group, M, M$_1$, and M$_2$ are preferably —N$^{\oplus}$R$_1$R$_2$R$_3$, in which R$_1$, R$_2$, and R$_3$ each represents a hydrogen atom, or an alkyl, alkenyl, substituted alkyl, or substituted alkenyl group having from 1 to 12 carbon atoms. Preferably, in the polar groups, $R_1$, $R_2$, and $R_3$ each has at most one hydrogen atom on average of $R_1$, $R_2$, and $R_3$. Examples of the alkyl group include a methyl group, an ethyl group, a propyl group, a butyl group, an isobutyl group, a t-butyl group, etc.; examples of the substituted alkyl group include a tolyl group, a methylol group, etc.; and examples of the alkenyl group include a vinyl group, a propenyl group, etc. Preferred polar groups for the binder of the present invention include combinations of any one of —COO, —SO$_3$, —OSO$_3$, —PO$_3$, and —OPO$_3$; and any one of —NH(C$_2$H$_5$)$_3$, —NH(C$_2$H$_5$)$_2$C$_6$H$_{13}$, and —N(C$_2$H$_5$)$_4$; or the like.

The polymers having the above-mentioned polar groups can be generally produced by the reaction described below. For example, the polymers can be produced by reaction of a vinyl chloride polymer or a polyurethane resin substituted with any of —COOH, —SO$_3$H, —OSO$_3$H$_2$, and —OPO$_3$H$_2$ and an alkylamine, dialkylamine, trialkylamine, or tetraalkylammonium hydroxide; copolymerization of a polymerizable unsaturated (double bond-containing) compound having the above-mentioned polar group and an other copolymerizable compound; condensation of a polyhydric alcohol having the above-mentioned polar group and a diisocyanate; or condensation of a dicarboxylic acid having the above-mentioned polar group and a polyhydric alcohol, etc. The polymers may further contain any other polar group(s), such as a hydroxyl group, an epoxy group, an isocyanate group, etc., in addition to the above-mentioned polar groups.

The present invention is characterized in that the above-mentioned polymers as the binder are vinyl chloride resins and/or polyurethane resins. The above-mentioned polar groups can be introduced into the vinyl chloride resins and/or polyurethane resins as described below.

(1) Introduction of Polar Groups into Vinyl Chloride Resins

Polar groups are introduced into the side chain of vinyl chloride resins to give polymers of a general formula:

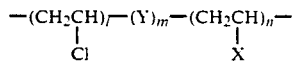

in which X represents the above-mentioned polar group; Y represents a monomer having a vinyl group copolymerizable with vinyl chloride; and l, m, and n each represent the polymerization degree of the respective components. In the above-mentioned general formula, the respective components of the polymer are represented to be regularly arranged in order as a matter of convenience, but such regular arrangement is not required and the respective components and may be regularly repeated by definite proportions or these may be arranged at random. These resins can be produced by conventional techniques described later.

In the above-mentioned general formula, the vinyl chloride component determines the strength of the resulting magnetic layer film and the solubility of the resin in solvents. The vinyl component moiety having a polar group in the side chain improves the dispersibility of ferromagnetic fine powder in the magnetic layer because of the polar group. However, if the polymerization degree n is less than about 0.1, the effect is insufficient, but if it is more than about 100, the function of improving the dispersibility would not greatly increase but would cause a problem with respect to the moisture-resistance of the magnetic layer. Accordingly, the polymerization degree of the polar group-containing vinyl component moiety is preferably from about 0.1 to 100. In addition to the above-mentioned copolymerizable monomers, at least one selected from vinyl acetate, vinyl alcohol, maleic acid, acrylic acid, acrylic acid esters, methacrylic acid, methacrylic acid esters, acrylonitrile, vinylidene chloride, vinyl propionate, etc. can also be copolymerized as the monomer Y component which is copolymerizable with vinyl chloride, for the purpose of improving the solubility of the resin in solvents and the crosslinkability with isocyantates, and of improving the strength of the coated layer. Additionally, the resulting copolymers may optionally be further modified, for example, by saponification, sulfonylation, or phosphorylation. These resins and processes for producing the same are described e.g., in Japanese patent application (OPI) Nos. 44227/82, 235814/85, 238306/85, 243933/86, 9521/87, etc.

(2) Introduction of Polar Groups into Polyurethane Resins

The polar groups can be introduced into the side chain of polyurethane resins. Polyurethane resins are generally obtained by reaction of a polyhydroxy compound and a polyisocyanate. The introduction of the above-metntioned polar groups into polyurethane resins can be effected, for example, by a method of mixing compounds having the above-mentioned polar group as a raw material for polyurethane resins; or a method of modifying the hydroxyl group remaining at the end or at the side chain of polyurethane resins with a compound having the above-mentioned polar group. The amount of the polar group introduced into the polyurethane resins is preferably from about 0.001 to 0.5 mmol/g, and more preferably from about 0.01 to 0.5 mmol/g. Polyurethane resins having excess polar groups exceeding this upper limit would have various problems, i.e., their dispersibility would be reduced because of the intramolecular or intermolecular aggregation, and their solubility would become selective to solvents so that the conventional solvents could not always be used.

Examples of the polyurethane resins include aliphatic polyesters or aromatic polyesters and mixtures thereof as well as other various polyurethane resins produced by reacting a polycaprolactone polyol or a polycarbonate polyol and a diisocyanate as a chain-extending agent. During the step for production of such polyurethane resins, dimethylolpropionic acid, trimellitic acid, 5-sodium sulfoisophthalic acid, 2-potassium sulfoterephthalic acid or the like can be added so as to optionally introduce the above-mentioned polar group into the resulting resins. These resins are described, e.g., in Japanese Patent Publication Nos. 41565/83, 18809/86, Japanese patent application (OPI) Nos. 148127/84, 40615/87, etc.

The above-mentioned high molecular polymers can be used as a binder, singly or in the form of a mixture of two or more of them. Thus, the binder is required to have a weight average molecular weight of from about 20,000 to 80,000, preferably from about 25,000 to 50,000 and required to contain a low molecular fraction having a molecular weight of 3,000 or less in an amount of about 3% by weight or less, preferably about 2% by weight or less based on the amount of the resin. For obtaining resins having such weight average molecular weight falling within the above-mentioned range, the condition of the polymerization catalyst to be used in the process of producing the resins is controlled or the molecular weight of the resins themselves is elevated. More effectively, the resins once produced are precipitated in a poor solvent (i.e., fractional precipitation), for example, alcohols such as methanol, ethanol, isopropanol, etc., aroamtic compounds such as benzene, toluene, xylene, etc., or aliphatic hydrocarbons such as pentane, hexane, heptane, octane, etc., for fractional precipitation. Such fractional precipitation is a known and certain method and has a characteristic merit that compounds to be removed can easily be selected.

Other high polymers which have heretofore been utilized as a binder can be used together with the above-mentioned characteristic binder of the present invention in an amount that does not exceed the amount of the binder of the present invention (i.e., less than 50 wt % of the binder). Such high polymers include acrylate-acrylonitrile copolymers, acrylate-vinylidene chloride copolymers, other acrylic acid series copolymers, nylon-silicone resins, cellulose derivatives such as nitrocellulose, vinylidenechloride acrylonitrile copolymers, polyamide resins, polyvinyl-butyral, styrene-butadiene copolymers, phenol resins, epoxy resins, urea resins, melamine resins, polyester resins, chlorovinylether-acrylate copolymers, methacrylate copolymers, diisocyanate blend polymers, amino resins, and various kinds of synthetic rubbers.

In accordance with the present invention, a thermosetting polyisocyanate compound may further be added to the binder component, so as to improve the durability of the resulting magnetic layer. Polyisocyanate compounds include isocyanates such as tolylene-diisocyanate, 4,4-diphenylmethane diisocyanate, hexamethylene diisocyanate, xylene diisocyanate, naphthylene 1,5-diisoicyanate, o-toluidine diisocyanate, isophorone diisocyanate, triphenylmethane triisocyanate, etc., products of these isocyanates and polyalcohols, and polyisocyanates formed by condensation of isocyanates, etc. These polyisocyanates are commercially available in the trade name of "Collonate L", "Collonate HL", "Collonate 2030", "Collonate 2031", "Collonate 2036", "Collonate 3014", "Collonate 2015", "Millionate MR", "Millionate MTL", "Dult Sec 1350", "Dult Sec 2170", and "Dult Sec 2280", (trade names of Nippon Polyurethane Co.), "Takenate D-102", "Takenate D-110N", "Takenate D-220", and "Takenate D-202" (trade names of Takeda Chemical Industries, Co.), "Desmodur L", "Desmodur IL", "Desmodur N", and "Desmodur HL" (by Sumitomo Bayer Co.), etc., and these these can be used singly or in the form of a combination of two or more so as to utilize the difference in the hardening reactivity of the respective compounds. For the purpose of improving the hardening of the compounds, it is desired to use a compound containing many functional groups, such as hydroxyl groups and amino groups.

In addition to the above-mentioned binder components, it is also possible to add a reinforcing agent, a lubricant, an antistatic agent, a dispersing agent, etc. to the magnetic layer.

The reinforcing agent include substances having a Moh's hardness of 6 or more, such as α-alumina, fused alumina, chromium oxide, corundum, α-iron oxide, silicon nitride, boron nitride, silicon carbide, diatomaceous earth, dolomite, etc., in the form of a powder having a average grain size of from about 0.005 to 5 μm. These substances can be used singly or in the form of a mixture of two or more of them, if desired. The reinforcing agent is used in an amount of from about 0.05 to 20 parts by weight per 100 parts by weight of the binder.

The lubricant includes silicone oil, graphite, molybdenum disulfide, boron nitride, fluorinated graphite, tungsten disulfide, fluorinated alcohols, polyolefins, polyglycols, alkyl-phosphoric acid esters, polyphenylethers, higher fatty acid alcohols, etc. Further, additives for a conventional lubricant oil, for example, an antioxidant such as alkylphenols, etc., a rust inhibitor such as naphthenic acid, etc., an oily agent such as lauryl alcohol, an extreme pressure additive such as dibenzylsulfide, etc., as well as other cleaning and dispersing agents, viscosity index-improving agents, pour point-depressing agents, anti-foaming agents, etc. can also be added. The lubricant is used in an amount of from about 0.05 to 20 parts by weight per 100 parts by weight of the binder.

The antistatic agent includes an electroconductive powder of graphite, various kinds of carbon black, carbon black-graft polymer, tin oxide-antimony oxide compounds, etc.; a natural surfactant such as saponin, etc.; a nonionic surfactant such as alkylene oxide compounds, glycerin compounds, glycidol compounds, polyhydric alcohols, polyhydric alcohol esters, etc.; a cationic surfactant such as higher alkylamines, cyclic amines, hydantoin derivatives, amides, amines, esteramides, quaternary ammonium salts, pyridines and other heterocyclic compounds, phosphonium or sulfonium compounds, etc.; an anionic surfactant having an acid group such as a carboxylic acid group, a sulfonic acid group, a phosphoric acid group, a sulfate group, a phosphate group, etc.; and an ampholytic surfactant such as amino acids, aminosulfonic acids, sulfates or phosphates of aminoalcohols, alkylbetaine compounds, etc. These antistatic agents can be used singly or in the form of a mixture of two or more of them. The average particle size of the above electroconductive powder is preferably from 1 to 200 mμ, and more preferably from 10 to 150 mμ. These antistatic agents have not only a capacity as an antistatic agent but also other capacities of improving dispersibility, improving magnetic characteristics, improving lubricating properties, improving coatability, etc. The antistatic agent is used in an amount of from about 0.01 to 10 parts by weight or so per 100 parts by weight of the binder.

The dispersing agent includes fatty acids having from 10 to 22 carbon atoms such as caprylic acid, capric acid, lauric acid, myristic acid, palmitic acid, stearic acid, oleic acid, elaidic acid, linolic acid, linolinic acid, stearolic acid, etc., metal soaps of these fatty acids with alkali metals, alkaline earth metals, copper, lead, etc., as well as lecithin, higher alcohols and sulfates or phosphates of these alcohols, etc. These dispersing agents can be used singly or in the form of a mixture of two or more of them. The dispersing agent is used in an amount of from about 0.01 to 10 parts by weight or so per 100 parts by weight of the binder.

The coating composition for forming the magnetic layer is prepared by basically blending the above-mentioned constitutional component, or specifically, dissolving a selected binder in a solvent which can dissolve the binder, adding a ferromagnetic fine powder to the resulting solution and stirring and uniformly dispersing the powder therein. As the solvent for preparing the binder solution, there may be mentioned various solvents, for example, ketone solvents such as acetone, methyl ethyl ketone, methyl isobutyl ketone, cyclohexanone, isophorone, etc., alcohol solvents such as methanol, ethanol, propanol, butanol, isopropyl alcohol, isobutyl alcohol, methylhexanol, etc., ester solvents such as methyl acetate, ethyl acetate, butyl acetate, isobutyl acetate, isopropyl acetate, ethyl butyrate, ethyl lactate, ethylene glycol-monoacetate, etc., ether solvents such as glycol acetate-monoethyl ether, glycol dimethylether, glycol monoethylether, tetrahydrofuran, dioxane, etc., aromatic hydrocarbon solvents such as benzene, toluene, xylene, cresol, styrene, etc., halogenated hydrocarbon solvents such as methylene chloride, ethylene chloride, carbon tetrachloride, chloroform, dichlorobenzene, etc., as well as N,N-dimethylformamide, etc. These can selectively be used for the selected binders, and can be used alone or in the form of a combination of two or more of them.

These organic solvents are selected so as to be able to completely dissolve the components to be dissolved, and in the case of a mixed solvent, the proportion of the respective solvent components is properly determined along with the selection of the solvent components. These solvents must not deteriorate the characteristics of the ferromagnetic fine powder in the magnetic layer.

For dissolution or dispersion of the above-mentioned components in organic solvent there can be used, for example, a two-roll mill, a three-roll mill, a ball mill, a bubble mill, a tron mill, a sand grinder, an attritor, a high speed impeller, a dispersing machine, a high speed stone mill, a high speed impact mill, a disper, a kneader, a high speed mixer, a ribbon blender, a cokneader, an intensive mixer, a tumbler blender, a disperser, a homogenizer, an ultrasonic dispersing machine, etc.

After completion of the dispersion, the magnetic layer-forming coating composition is coated on a support by various coating methods, for example, by air doctor coating, blade coating, air knife coating, squeeze coating, dip coating, reverse roll coating, transfer roll coating, gravure coating, cast coating, spray coating, etc. The magnetic layer coated preferably has a dry thickness of about 5 μm or less, more preferably 3.5 μm or less.

The non-magnetic support on which the magnetic layer is formed may be a film or sheet support comprised of, for example, polyester resins such as polyethylene terephthalate or polyethylene naphthalate, polyolefin resins such as polypropylene, cellulose derivatives such as cellulose diacetate or cellulose triacetate, vinyl chloride resins such as polyvinyl chloride, polysulfone resins, polycarbonate resins, polymide resins, polyamide resins, etc.; or a foil or plate-like support of metal materials such as aluminum or copper or various kinds of ceramic materials. The support may be previously shaped, or alternatively, after being coated with a magnetic layer and optionally a backing layer, which is described hereinafter, the support can be cut and shaped into the intended form. The support may optionally be pretreated, for example, by corona discharge treatment, plasma treatment, subbing treatment, heat treatment, metal evaporation plating treatment, alkali treatment, etc.

The magnetic layer as coated on the support by the above-mentioned various methods is, in general, subjected to conventional magnetic field orientation treatment in the course of the drying step so that the ferromagnetic fine powder in the magnetic layer is oriented, and then the drying step is completed.

The techniques for coating the magnetic layer-forming coating composition, magnetic field orientation treatment and drying are known ones, and there can properly be utilized or applied by one skilled in the art to the present invention.

In the case of magnetic tapes according to the invention, especially when a plastic film tape support is used, it is desired to form a backing layer which has a proper composition on the back surface of the tape. As the components for the backing layer-forming coating composition, the same binders, organic solvents, and inorganic lubricants as those for the components of the above-mentioned magnetic layer-forming coating composition can be used, and the backing layer may contain properly selected inorganic lublicants. The inorganic lubricant for use in the backing layer is a fine powder preferably having a mean grain size of about 0.8 μm or less, and more preferably about 0.4 μm or less. The mixture proportion of the binder to the inorganic lubricant in the backing layer is about 1:0.1 to 1:4 by weight. In the same manner as the formation of the magnetic layer, a fine powder of an inorganic substance as the lubricant can be uniformly dispersed in an organic solvent of the binder to prepare a backing layer-forming coating composition. The resulting coating composition is coated on the back surface of the above-mentioned support on which a magnetic layer has been formed or is to be formed, and then dried to form the intended backing layer. The thickness of the layers coated on the magnetic recording medium is required to be as thin as possible so as to elevate the recording density per unit, and accordingly, the thickness of the backing layer is preferably from about 0.3 to 1.5 μm. The techniques for preparation, coating, and drying of the backing layer-forming coating composition may be same as those in the formation of the magnetic layer. The order of the provision of the magnetic layer and the backing layer on a support may be selected optionally. The backing layer which can be used in the present invention is described, e.g., in Japanese patent application (OPI) No. 17401/77 and U.S. Pat. No. 3,761,311.

The thus formed magnetic layer and backing layer may optionally be subjected to various surface treatments, for example, a calender treatment. In accordance with the required embodiments, the coated support can be worked into any desired shape, such as a tape, card, disc, sheet, etc. Further, in accordance with the kind of magnetic recording media, the thus shaped products may be put in various cassettes or cases, adhered to various base substrates, or laminated with other materials to form final products. In any case, one skilled in the art can easily finish the magnetic recording medium of the present invention, utilizing and applying the related conventional techniques, to complete the intended final product.

The present invention is now explained in greater detail with reference to specific examples and comparative examples shown below but the present invention is not to be construed as being limited thereto. Unless otherwise indicated, all parts, percents, and ratios are by weight.

The results obtained by measurement of the samples of the examples are all shown in Table 1 attached at the end of the examples.

EXAMPLE 1

The magnetic layer-forming coating composition prepared as mentioned below was coated on polyethylene terephthalate film having a 10 μm thickness as a support and then subjected to magnetic field orientation treatment with a cobalt magnet followed by drying by passing through a 100° C. atmosphere for 1 minute to form a magnetic layer having a 3 μm thickness on the support.

Preparation of Magnetic Layer-forming Coating Composition

| Composition: | |
| --- | --- |
| Ferromagnetic Alloy Fine Powder ($S_{BET}$: 50 m$^2$/g, coercive force Hc: 1.500 Oe) | 100 parts |
| Resin B (see Table 1) | 10 parts |
| Resin H (see Table 1) | 10 parts |
| Carbon Black (average grain size: 20 mμ) | 1 part |
| Chromium Oxide Powder (average grain size: 0.5 μm) | 2 parts |
| Stearic Acid | 2 parts |
| Amyl Stearate | 2 parts |
| Methyl Ethyl Ketone | 150 parts |
| Cyclohexanone | 150 parts |

Preparation: The above-mentioned composition was put in a sand grinder together with glass beads and ground and dispersed for 2 hours, and then a solution of 5 parts of a 7.5 wt % ethyl acetate solution of a tri-functional polyisocyanate compound formed by addition reaction of 3 mols of toluenediisocyanate and 1 mol of trimethylolpropane, Dedmodur L (manufactured by Bayer, West Germany) mixed with 10 parts of a methyl ethyl ketone/toluene mixed solvent was added thereto and stirred and blended at a high speed to obtain the intended magnetic layer-forming coating composition.

After the magnetic layer was formed as mentioned above, this was subjected to calender treatment and hardening treatment under heat, and then the thus-formed magnetic layer-having support was cut into an 8 mm wide magnetic recording tape. This was designated as Sample 1.

EXAMPLES 2 TO 7 AND COMPARATIVE EXAMPLES 1 AND 2

The same process as Example 1 was repeated except that the resins as indicated in Table 2 were used in place of Resin B and Resin H to form various kinds of magnetic recording tapes. These were designated as Samples 2 to 7 and Comparative Samples 1 to 2, respectively.

The binder resins used in the Examples and Comparative Examples were as follows:

(1) Resin A: Polyester polyurethane resins containing 6×10$^{-5}$ equivalent/g of SO$_3$Na. (This was produced in accordance with the example in Japanese Patent Publication No. 41565/83.)
(2) Resin B: 1 kg of a 30 wt % solution of Resin A in 1/1 methyl ethyl ketone/toluene was precipitated in 6 kg of hexane and then dried.
(3) Resin C: 1 kg of a 30 wt % solution of Resin A in 1/1 methyl ethyl ketone/toluene was precipitated in 6 kg of 7/3 hexane/toluene and then dried.
(4) Resin D: Polyester polyurethane resin containing 6×10$^{-5}$ equivalent/g of COOH. (This was produced in accordance with the example of Japanese patent application (OPI) No. 148127/84.)
(5) Resin E: 1 kg of a 30 wt % solution of Resin D in 1/1 methyl ethyl ketone/toluene was precipitated in 6 kg of hexane and then dried.
(6) Resin F: 1 kg of a 30 wt % solution of Resin D in 1/1 methyl ethyl ketone/toluene was precipitated in 6 kg of 7/3 hexane/toluene and then dried.
(7) Resin G: Vinyl chloride copolymer containing 6×10$^{-5}$ equivalent/g of SO$_3$Na. (This was produced in accordance with the example 1 mentioned in Japanese patent application (OPI) No. 238306/85.)
(8) Resin H: 1 kg of a 30 wt % methyl ethyl ketone solution of Resin G was precipitated in 10 kg of methanol and then dried.
(9) Resin I: 1 kg of a 30 wt % methyl ethyl ketone solution of Resin G was precipitated in 6 kg of methanol and then dried.
(10) Resin J: Vinyl chloride copolymer containing 6×10$^{-5}$ equivalent/g of COOH, (MPR-TM, manufactured by Nisshin Chemical Co,. Japan).
(11) Resin K: 1 kg of a 30 wt % methyl ethyl ketone solution of resin J was precipitated in 10 kg of methanol and then dried.
(12) Resin L: 1 kg of a 30 wt % methyl ethyl ketone solution of resin J was precipitated in 6 kg of methanol and then dried.

TABLE 1

| Resin | Weight Average Molecular Weight | Content of 3.000 or Less Molecular Weight (wt %) |
| --- | --- | --- |
| (A) | 57,000 | 4.6 |
| B | 58,000 | 1.3 |
| C | 58,000 | 2.2 |
| (D) | 53,000 | 6.0 |
| E | 53,000 | 1.4 |
| F | 53,000 | 2.6 |
| (G) | 45,000 | 3.8 |
| H | 46,000 | 1.0 |
| I | 46,000 | 2.9 |
| (J) | 55,000 | 4.0 |
| K | 56,000 | 1.5 |
| L | 55,000 | 3.0 |

The weight average molecular weight and the content of 3,000 or less molecular weight fraction were determined by GPC using 0.5% THF solution of the measured sample and the standard polystyrene.

The samples thus prepared were examined with respect to (1) video S/N, (2) decrease in video S/N after 30 pass-repeated running test, (3) stain of video head after 30 pass-repeated running test, and (4) stain of audio head after 30 pass-repeated running test, and the results obtained were shown in Table 2 below. Each measurement was effected as mentioned below.

Method of Measurement:

(1) Video S/N: Each sample was put in a video tape recorder (FUJIX-8, trade name by Fuji Photo Film Co.) and run, and the noise was measured with a Noise Meter 925 R (trade name by Shibasoku Co., Japan). The case of Comparative Sample 1 was indexed to be "0 dB", and the difference in S/N between each sample and Comparative Sample 1 was calculated.

(2) Decrease in video S/N after 30 pass-repeated running test: The initial video S/N of each sample was standarized, and the decrease of the video S/N after 30 pass-repeated running test was measured in each sample.

(3) and (4) Head stain: After 30 pass-repeated running test, the stain of the video head (3) and that of the audio head (4) were observed with a microscope. "A" means no stain, and "B", "C" and "D" mean the degree of the stain in that order, the last "D" being most severe. The rank "A" to "C" can be practically used, and the rank "D" cannot be used.

TABLE 2

| Example | Sample No. | Resins Used As Components of Magnetic Layer-forming Binder Equivalent Mixture | SN: dB Video | Decrease of S/N: dB | Stain of Video Head | Stain of Audio Head |
|---|---|---|---|---|---|---|
| Invention | Sample 1 | B and H | +0.5 | 0.8 | A | A |
| | Sample 2 | E and K | +0.4 | 1.2 | A | A |
| | Sample 3 | C and I | +0.2 | 1.7 | B | B |
| | Sample 4 | F and L | +0.2 | 1.6 | B | B |
| | Sample 5 | B and K | +0.4 | 1.0 | A | B |
| | Sample 6 | (A) and I | +0.1 | 2.1 | B | C |
| | Sample 7 | F and (J) | ±0.0 | 2.0 | B | C |
| Comparison | Sample 1 | (A) and (G) | ±0.0 | 2.5 | D | D |
| | Sample 2 | (D) and (J) | −0.1 | 2.7 | D | D |

(Note): The resins parenthesized in Tables 1 and 2 had more than 3 wt % content of a component of 3000 or less molecular weight.

The results of Table 2 demonstrate that the resins having a low molecular weight in the binder components for the magnetic layer noticeably interfered with the running durability of the magnetic recording medium. Accordingly, the advantageous effect of the present invention of improving the durability of the magnetic layer of a recording medium is remarkable, resulting from the elevation of the resin components having a higher molecular weight in the binder of the magnetic layer.

According to the present invention, the content of a lower molecular weight fraction in the resin components in the magnetic layer-forming binder is minimized so that the resulting magnetic layer has excellent magnetic characteristics and high running durability. Thus a magnetic recording medium with low running friction and video S/N deterioration can be provided by the present invention.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer comprising ferromagnetic fine powder uniformly dispersed in a binder, wherein said binder consists essentially of a mixture of a vinyl chloride resin and a urethane resin, said resin for said binder has a weight average molecular weight of about from 20,000 to 80,000 and each of said chloride resin and urethane resin for said binder containing a low molecular weight fraction having a weight average molecular weight of about 3,000 or less in an amount of about 3 wt % or less based on the amount of said resin, and wherein said binder further comprises a polyisocyanate compound.

2. A magnetic recording medium as claimed in claim 1, wherein said ferromagnetic fine powder is a ferromagnetic alloy powder having a specific surface area $S_{BET}$ of 40 m$^2$/g or more measured BET method.

3. A magnetic recording medium as claimed in claim 2, wherein said ferromagnetic fine powder is a ferromagnetic alloy powder having a specific surface area $S_{BET}$ of 45 m$^2$/g or more measured BET method.

4. A magnetic recording medium as claimed in claim 1, wherein said resin for said binder contains at least one of —SO$_3$M, —OSO$_3$M, —COOM, —OPO(OM$_1$)(OM$_2$), and —PO(OM$_1$)(OM$_2$) in an amount of from $1 \times 10^{-6}$ to $50 \times 10^{-6}$ equivalent/g, in which M, M$_1$, and M$_2$, which may be the same or different, each represents a hydrogen atom, an alkali metal atom, or —N$^\oplus$R$_1$R$_2$R$_3$, in which R$_1$, R$_2$, and R$_3$, each represents a hydrogen atom, or an alkyl, alkenyl, substituted alkyl, or substituted alkenyl group having from 1 to 12 carbon atoms.

5. A magnetic recording medium as claimed in claim 4, wherein M, M$_1$, and M$_2$ each represents —NH(C$_2$H$_5$)$_3$, —NH(C$_2$H$_5$)$_2$C$_6$H$_{13}$, or —N(C$_2$H$_5$)$_4$.

6. A magnetic recording medium as claimed in claim 1, wherein said resin for said binder has a weight average molecular weight of from 25,000 to 50,000 and contains a low molecular weight fraction having a weight average molecular weight of 3,000 or less in an amount of from 2 wt % based on the amount of said resin.

7. A magnetic recording medium as claimed in claim 1, wherein said resin for said binder is formed by fractional precipitation using a poor solvent so as to decrease the content of a low molecular weight fraction.

8. A magnetic recording medium as claimed in claim 1, wherein the thickness of said magnetic layer is 5 μm or less.

9. A magnetic recording medium as claimed in claim 1, wherein said polyisocyanate compound is contained in an amount of from 10 to 50 wt %.

* * * * *